United States Patent
Kumpf et al.

[11] Patent Number: 5,513,487
[45] Date of Patent: May 7, 1996

[54] PROCESS AND APPARATUS FOR REVERSE-TWISTING CABLE ELEMENTS

[75] Inventors: Friedhelm Kumpf, Pulheim; Dietmar Lieder; Rainer Düwelhenke, both of Ratingen, all of Germany

[73] Assignee: Frisch Kabel-und Verseilmaschinenbau GmbH, Germany

[21] Appl. No.: 238,453

[22] Filed: May 5, 1994

[30] Foreign Application Priority Data

May 7, 1993 [DE] Germany ............ 43 15 227.9
Apr. 9, 1994 [DE] Germany ............ 44 12 299.3

[51] Int. Cl.⁶ .................................................. D01H 13/00
[52] U.S. Cl. .................................................. 57/294; 57/352
[58] Field of Search .............................. 57/204, 205, 293, 57/294, 297, 2.3, 352, 361

[56] References Cited

U.S. PATENT DOCUMENTS

| 2,881,582 | 4/1959 | Robbins | 57/2.3 X |
|---|---|---|---|
| 4,056,925 | 11/1977 | Vogelsberg | 57/293 |
| 4,207,928 | 6/1980 | Pershin et al. | 57/294 X |
| 4,214,430 | 7/1980 | Vogelsberg et al. | 57/294 X |
| 4,224,788 | 9/1980 | Vogelsberg | 57/294 |
| 4,339,913 | 7/1982 | Vogelsberg | 57/294 |
| 4,365,469 | 12/1982 | Vogelsberg | 57/293 |
| 4,429,521 | 2/1984 | Oestreich | 57/294 |
| 4,432,199 | 2/1984 | Dzyck et al. | 57/294 |
| 4,586,327 | 5/1986 | Oestreich | 57/293 X |
| 4,974,408 | 12/1990 | Karhu | 57/293 |

FOREIGN PATENT DOCUMENTS

| 2412514 | 9/1975 | Germany | 57/294 |
|---|---|---|---|
| 2262705 | 6/1977 | Germany . | |
| 3404264 | 8/1985 | Germany | 57/293 |

*Primary Examiner*—Joseph J. Hail, III
*Attorney, Agent, or Firm*—Ware, Fressola, Van Der Sluys & Adolphson

[57] ABSTRACT

An apparatus to reverse-twist cable elements in the discharge direction, while at the same time the resulting twisted discharge is taken up in a storage path includes a mandrel for expanding the cable elements prior to the twisting thereof in the discharge direction.

23 Claims, 5 Drawing Sheets

PROCESS AND APPARATUS FOR REVERSE-TWISTING CABLE ELEMENTS

BACKGROUND OF THE INVENTION

The present invention generally relates to a process and an apparatus for twisting cable elements and, in particular, relates to one such process and apparatus wherein the cable elements are drawn from fixed storage points, and during the twisting in the discharge direction are twisted in alternating directions and at the same time the twisted discharge is taken up in a storage path.

As used herein, the phrase "cable elements", as well as the idiomatic variations thereof, is taken to include, for example, the conductors of electrical and optical cables or lines of all kinds. In addition, the phrase "cable elements" can also include extended elements of a higher order, for example, where individual cable elements are already joined and are themselves to be reverse-twisted. These are, for example, pairs, quads or bundles. Further, the phrase "cable elements" can also include plastic threads or bare metal wires, or the like, which are used, for example, for the concentric protective conductor of high voltage power lines.

The so-called reverse-twisting, wherein the twist direction of the cable elements changes at intervals, has been used for a long time in the cable technology. Compared to twisting processes wherein the twist direction remains the same, the use of reverse-twisting is advantageous in that no rotating coils with the inherent large moving masses thereof are used. Conventionally, processes for twisting wherein the twist direction remains the same typically only provide a limited length for the twisted product to be manufactured. Furthermore, the use of reverse-twisting permits continuous manufacture at high discharge speeds.

In conventional reverse-twisting processes, for example, as discussed in DE-OS 22 62 705 it is known to guide the cable elements between a fixed and a rotating guide disk inside of hoses. The hoses are made of plastic with a low coefficient of friction, and are provided to prevent the individual cable elements from becoming tangled between the stationary disk and the rotating disk during the manufacturing run.

It has been found that such processes exhibit a number of drawbacks. For example, before such a twisting run can be started, each individual cable element must be threaded into the relatively long hoses. This step can be quite time consuming and therefore can be quite expensive. Furthermore, the hoses can be easily contaminated, or loaded up, to the point that the coefficient of friction between the hose and the cable element can lead to the breakage of the cable elements. Still further, the output capacity of conventional arrangements is limited by the number of twisted cables that can be stored.

Consequently, it is highly desirable to provide a process and a apparatus for the reverse-twisting of cable elements that does not require extensive threading time and overcomes the above-recited drawbacks of conventional processes and apparatus.

SUMMARY OF THE INVENTION

Accordingly, one object of the present invention is to provide a process and a apparatus for the reverse-twisting of cable elements which overcomes the above recited drawbacks.

This object is accomplished, at least in part, by a process and apparatus for reverse-twisting cable elements such that the cable elements in a storage path are twisted into a cable. The twisted cable in the storage path is expanded radially after each change in the direction of rotation and the cable elements are then twisted in the opposite direction after the cable is expanded. The present apparatus avoids the use of relatively long guide hoses for the individual cable elements in the storage path and thus minimizes the rotating masses in the storage path. As an additional benefit, since the cable elements are only twisted with each other-along the storage path, all maintenance work during operation is eliminated and the twisting process can run at high production speeds.

Depending upon the particular type of cable elements being reverse-twisted, for example, the flexibility of individual conductors of high voltage power lines or optical waveguide elements, it will be advantageous if the cable that is twisted in the storage path is prevented from drifting from the guides that limit its trajectory inside this path.

In one aspect of the present process a twisting apparatus that includes a fixed disk and a rotating perforated disk spaced apart from the fixed disk such that storage path is defined between these disks. In such an arrangement, it has been demonstrated to be of special advantage to provide the rotating perforated disk with a centrally located conical mandrel pointing in the direction of the storage path. In such an embodiment, the conical mandrel is provided with a guide nipple at the tapered end thereof, which guide nipple operates in conjunction with the mandrel. The guide nipple directs the cable consisting of cable elements in the direction of the mandrel point. The mandrel point extends into the twisted cable elements and widens, or expands, the cable such that, during the rotation of the guide disk about the surface of the mandrel, the individual cable elements extend through the holes in the rotating perforated disk. The cable elements are then led to the twisting point located in the discharge direction behind the rotating perforated disk.

In such an arrangement, since the cable elements are guided during the throughput along the mandrel surface, the mandrel is coated with a material having a relatively low coefficient of friction, for example polytetrafluorethylene (PTFE). Alternatively, the mandrel can be fabricated entirely from such a material having a relatively low coefficient of friction.

Preferably, the guide nipple and the mandrel are functionally and proximately disposed with respect to each other. Alternatively, the guide nipple could be provided with free-running bearings, but it is advantageous if the guide nipple is driven in the respective twisting direction. Furthermore, it can often be advantageous to allow the conical mandrel to rotate freely inside the perforated disk. Hence, in the preferred arrangement, the mandrel is combined with the perforated disk.

The slope of the conical mandrel can be varied depending on the mechanical properties of the cable elements being twisted. Further, depending on the diameter of the individual cable elements and the cross-section of the twisted cable, different diameters of the guide nipple can be required. As a result both the guide nipple and the conical mandrel are each, preferably, interchangeable. Further, the guide nipple is disposed such that it can move back and forth with respect to the conical mandrel. Hence, depending on the requirements, the point of the conical mandrel can either enter into the guide nipple or be located at a predetermined distance in front of the guide nipple.

High running speeds, such as are possible with the present process and the apparatus, could result in the autonomous movement of the twisted cable along the storage path. This autonomous movement of the twisted cable is manifested, for example, by the twisted cable drifting away from the production axis. In another aspect of the invention, to prevent such disturbances throughout an entire production run, fixed guides are provided to receive the twisted cable and limit its trajectory along the storage path. In contrast to known conventional apparatus the fixed guides of the present invention do not form guide elements for the individual cable elements that are drawn into the twisting process but instead surround the entire twisted cable. Typically, relatively short lengths of tubing or rings, disposed at intervals are suitable for such guide elements.

The widening of the twisted cable in the radial direction in the storage path can also be accomplished by the use of cabling disks. The cabling disks are rotating disks with guide holes through which the cable elements are threaded. As a result the individual cable elements are forced, or separated, from the twisted union. The degree of separation of the cable elements is a function of the diameter of the circle of perforated holes in the respective cabling disk. This also leads to the fact that the cabling disks are driven by the cables that are created in alternating directions of rotation against the discharge direction. One variation of the general configuration of the present invention is that the cabling disks do not run freely during the twisting process, but can be braked by an adjustable braking force. Another useful feature available is the provision of a drive for the cabling disks, for example, through a bearing friction or the adjustable braking force in accordance with the rotating characteristics needed for problem free twisting.

Similar to the above described mandrel, which serves to expand the cable elements, the use of cabling disks also requires that the cable elements be guided with as little friction as possible. To that effect, the parts of the cabling disks that contact the running cable elements must be made of a material having a relatively low coefficient or friction. Further, the inlet and outlet radii of the guide holes can be cooperatively shaped to the throughput line of the cable elements.

In such an arrangement, one or more cabling disks are arranged along the storage path. Hence, the total storage path is effectively divided into partial storage paths and thus results in a particularly orderly run of the cable elements through the overall storage path. It is particularly advantageous to configure freely adjustable intervals between the individual cabling disks as well as the distance between the cabling disks and the rotating perforated disk which is also referred to as a twisting disk. Consequently, it is possible to adapt the partial storage paths to the number and size of the cable elements.

It will be understood of course, that the use of cabling disks along the storage path does not preclude the use of the conical mandrel. These two elements can be used separately or in combination with each other. If the conical mandrel is eliminated in favor of one or more cabling disks, the cabling disks are preferably installed immediately before the rotating perforated disk and has similar rotating characteristics as the rotating perforated disk itself. It is therefore advantageous to dispose the rotating perforated disk in the twisting head. By such an arrangement, the rotating perforated disk freely drives the cabling disk by bearing friction during the change in direction of the rotating perforated disk.

Alternatively, it can be advantageous to drive the cabling disks in accordance with the individual rotating characteristics thereof by use of individual drive motors through the bearing. This arrangement would be particularly useful for a special twisting construction or for special dimensions of the twisting elements.

As previously discussed, the processes and apparatus of the present invention are suited for high production speeds. In furtherance of this, a guide cone for the cable elements, which points in the direction of the axis, can be disposed on the side of the rotating perforated disk that faces away from the conical mandrel. Such a guide cone, which is also coated with a material having a relatively low coefficient of friction, or is constructed of such materials, takes the cable elements from the mandrel that protrudes into the storage path and guides the cable elements to the twisting point. This additional guide cone is of special significance for the subsequent installations, which receive the twisted cable and guide it in the discharge direction. For example, if a band pick-up is used as the discharge device behind the rotating perforated disk, it is useful if the pointed end of the guide cone protrudes into the area between the two pick-up bands. Such a location of the guide cone ensures that the twisted cable is immediately picked up and held by the two pick-up bands after it leaves the guide cone. At the same time such a guide cone acts as a torsion block for the twisting. This is of special advantage for achieving short twist change areas.

In addition to the band pick-ups to receive twisted cables and to guide them to machine parts located downstream or to a take-up drum, disk take-ups are known in the cable technology. In connection with the present twisting process, it has been observed that the length of the so-called twist change areas, which are practically equal to a parallel run of the cable elements to be twisted, can become significantly shorter when the circumferential surface of the disk take-up receiving the twisted cable is tangentially displaced with respect to the direction of the supply. For the cable coming from the twisting point this means a bent flow, which shortens the twist change areas.

Other objects and advantages will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
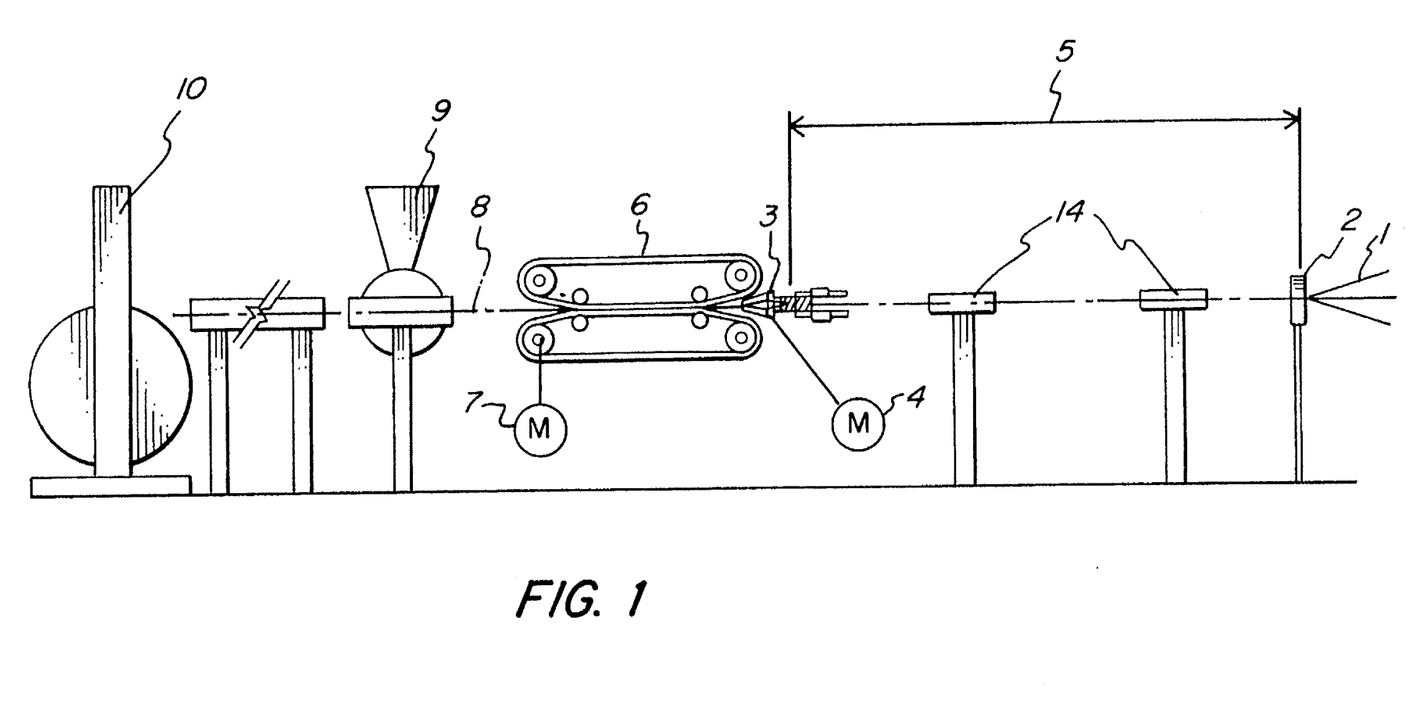
FIG. 1 which is a schematic diagram of an apparatus adapted for performing a process for reverse-twisting cable elements embodying the principles of the present invention and including an expansion mandrel.

An apparatus, generally indicated at 10 in the Figures and embodying the principles of the present invention, includes a plurality of cable elements 1 drawn from locally fixed storages, not shown in the drawings. The cable elements 1, for example, electrical or optical cables, are initially guided through a fixed perforated disk 2, as shown in FIG. 1. The apparatus 10 also includes a rotating perforated disk 3. In this embodiment, the rotating perforated disk 3 is driven in alternating rotational directions by an electric motor 4. The rotating perforated disk 3 is disposed at a relatively large distance from the fixed perforated disk 2. For example, the fixed perforated disk 2 and the rotating perforated disk 3 can be separated by a distance of about 10 meters. The fixed perforated disk 2 and the rotating perforated disk 3 define a storage path 5 therebetween. In the preferred embodiment, the apparatus 10 further includes a band pick-up 6 that, in this embodiment, is driven by the motor 7 and receives the cable 8 that was twisted by the rotating disk 3 and leads it to an extruder 9. The extruder 9 surrounds the cable 8 with a plastic jacket. Preferably, the extruder 9 is located as closely as possible to the band pick-up 6. The apparatus 10 also includes a winding device 10 to receive the jacketed cable from the extruder 9.

Figure 2:
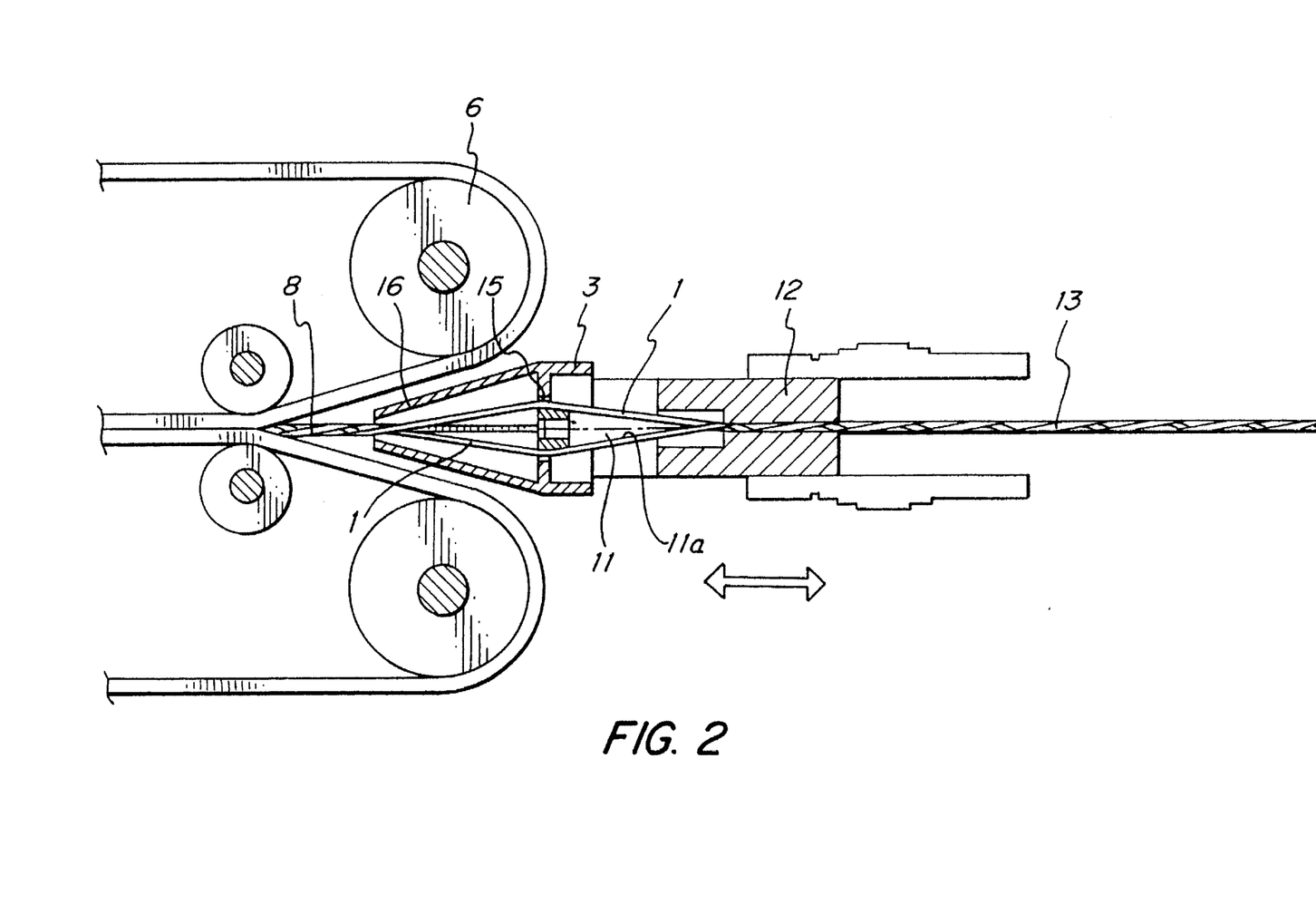
FIG. 2 which is an enlarged schematic diagram of the apparatus embodying the principles of the present invention and including a guide nipple and conical mandrel.

In operation, to twist the cable elements 1, the perforated disk 3 is first rotated a number of turns in one direction and then a corresponding number of turns in the other direction. As a result, in both cases the cable elements 1 guided through the perforated disk 3 in the discharge direction are twisted. However, at the same time, the cable elements 3 are twisted, or cabled, on the inlet side of the rotating perforated disk 3, i.e., along the storage path 5. As a result, the cable elements 3 exiting the fixed perforated disk 2 are cabled or twisted. In order for the cable elements 1 in the storage path 5 to freely enter into the rotating perforated disk 3 and be finally twisted into the cable 8, the rotating disk 3, as shown in FIG. 2, is provided with a conical mandrel 11. Preferably, the conical mandrel 11 protrudes, with the pointed end thereof, into the storage path 5 where it interacts with a guide nipple 12 that encloses the twisted cable 13 in the storage path 5. The conical mandrel 11 thus causes the cable elements 1 to expand, or separate, as they approach the rotating perforated disk 3. Hence, during the continuous draw of cable 8, the cable elements 1 are guided from the twisted cable 13 along the surface of the conical mandrel 11 and through the rotating perforated disk 3. The practically massless storage of the cable elements 1 along the storage path 5, aside from the mass of the cable elements, results in a maintenance-free operation, and high discharge speeds can be achieved.

In one embodiment, the conical mandrel 11 can be combined with the rotating perforated disk 3 so that it rotates freely inside the rotating perforated disk 3. Since the cable elements 1 are guided along the surface of the conical mandrel 11, the conical mandrel 11 may be coated 11a with a material having a relatively low coefficient of friction. For example, the conical mandrel 11 may have a coating 11a of polytetrafluorethylene (PTFE). Alternatively, the conical mandrel 11 can be fabricated entirely from such a material having a relatively low coefficient of friction.

In operation, particularly at high throughput speeds, it is possible for the twisted cable 13 running along the storage path 5 to drift from the twisting axis. To prevent this, at least one guide tube 14 is provided. The guide tubes 14 are spaced apart at preselected intervals and keep the twisted cable 13 in the passage direction along the storage path 5, i.e. the deviation of the cable elements 1 in the storage path 5 is confined by the guide tubes 14.

As shown in FIG. 2, the twisted cable 13 in the storage path 5 is supplied to a guide nipple 12, which is adapted to move back and forth with respect to the conical mandrel 11, as indicated by the arrows. This back and forth movement of the guide nipple 12 permits the distance between the discharge end of the guide nipple 12 and the start of the conical mandrel 11 to be varied. This distance can also become negative if the conical mandrel 11 protrudes into the guide nipple 12, as illustrated, to enable cable elements 1 having special characteristics to be twisted. The conical mandrel 11 expands the twisted cable 13 such that the cable elements 1 are guided along the surface of the conical mandrel 11 to the rotating perforated disk 3 and through the guide holes 15 thereof. The rotation of the rotating perforated disk 3 then twists the cable elements 1 into the final twisted cable 8, in accordance with the momentary direction of rotation of the perforated disk 3 in the one or the other direction.

In this embodiment, the band pick-up 6 receives the twisted cable 8 and delivers it to the extruder 9. In one embodiment, the apparatus be is provided with an additional guide cone 16 that is disposed on the rotating perforated disk 3 and points toward the band pick-up 6. Preferably, the guide cone 16 is provided so that the twisted cable 8 reaches the band pick-up, or torsion block, as early as possible. As shown, in this embodiment, the guide cone 16 protrudes into the input side end of the band pick-up 6. As a result, the cable elements 1 that pass through the inside of the guide cone 16 and are joined at the end into the cable 8 are immediately held by the surrounding band pick-up 6. This additional guide cone 16 can be in the form of a nozzle, or be equipped with another perforated disk. The provision of such a guide cone 16 ensures an extremely short twist change area for the cable elements 1. The cable elements 1 are thereafter fastened by jacketing with a suitable plastic material or by banding.

In the preferred embodiment, the guide nipple 12 can rotate freely, for example, so that it moves in one or the other direction of rotation with the passage of the twisted cable 13 through the rotating perforated disk 3. It can even be more advantageous, if the rotating perforated disk 3 and the guide nipple 12 are driven together in an alternating direction of rotation and/or rotational speed, to achieve the reverse-twisting.

Figure 3:
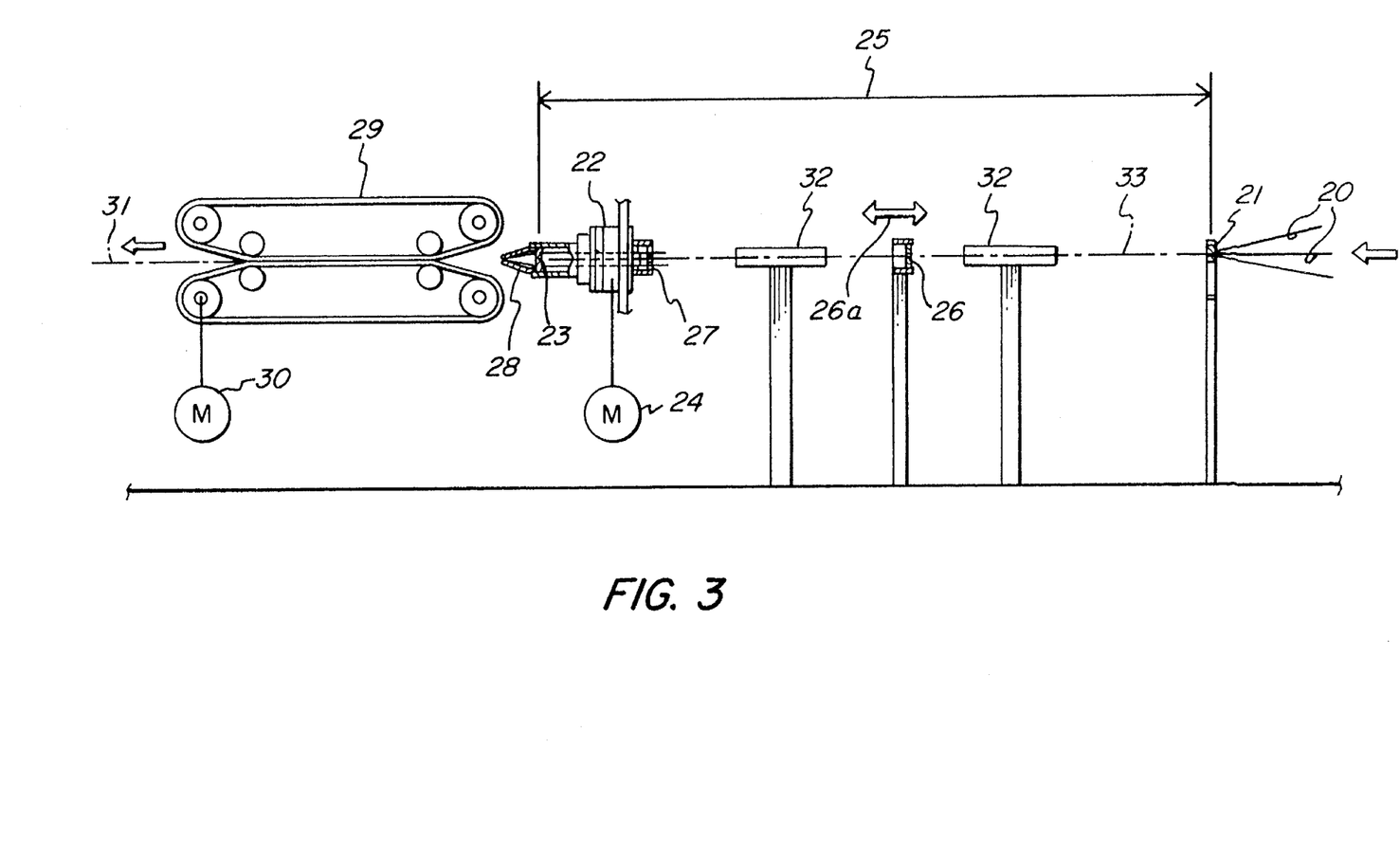
FIG. 3 which is a schematic diagram depicting an apparatus embodying the principles of the present invention and including cabling disks.

The twisting apparatus shown in FIG. 3 corresponds basically to that of FIG. 1. In this embodiment, the cable elements 20 are drawn from locally fixed storages, not shown, and supplied to the fixed perforated disk 21. A twisting head 22, containing the rotating perforated, or twisting, disk 23, is located at a distance of several meters from the fixed perforated disk 21. A motor 24 provides the driving force for the rotation of the perforated disk 23. In this embodiment, the storage path 25 is subdivided into two partial storage paths of about equal length, with the aid of the cabling disk 26 that transports the cable elements 20 in the direction of rotation of the configuration example.

Figure 4:
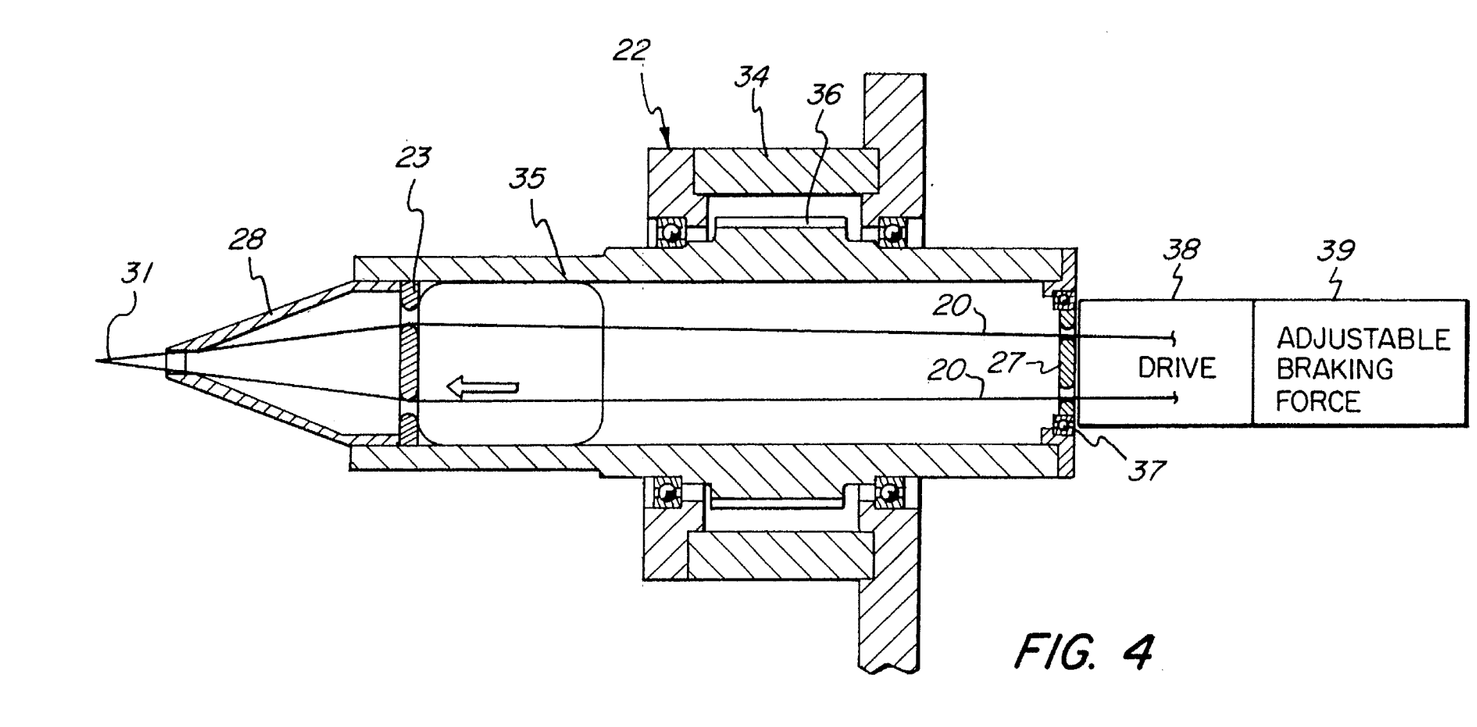
FIG. 4 which is a cross-sectional view of a twisting head particularly useful in conjunction with the apparatus shown in FIG. 3.

As clearly depicted in FIG. 4, a second cabling disk 27 is freely rotating directly at the entrance of the twisting head 22. The storage path 25, depending on the length thereof, can, in essence, be subdivided into a number of partial storage paths by a corresponding number of cabling disks 26. The cabling disks 26 may be mounted in the storage path 25 for axial movement in the direction of arrow 26a to allow the adjustment of the distance between the cabling disks 26 with respect to each other and with respect to the rotating perforated disk 23.

As shown in FIGS. 3 and 4, a guide cone 28 is provided at the output end of the twisting head 22 and protrudes with its point into the input end of the band pick-up 29 which, in this embodiment, is driven by motor 30. In this way the cable elements 20, which pass inside the guide cone 28 and are joined into cable 31 at the end of the guide cone 28, are immediately held by the surrounding torsion block, namely the band pick-up 29. Consequently, extremely short twist change areas can be achieved.

In accordance with the embodiment shown in FIG. 3, guide tubes 32 can be provided along the storage path 25 to prevent deflection of the cable elements 20 joined into cable 33. The provision of guide tubes 32 is particularly useful during high throughput speeds. Of course, other elements can also be used, for example, rings, to limit the trajectory.

FIG. 4 depicts the twisting head 22 in a larger scale. A rotor 35 rotates in the housing 34 and a belt drive 36 is provided to drive the twisting head 22 in alternating directions of rotation. Instead of a conical mandrel shown in FIGS. 1 and 2, a cabling disk 27 is provided at the input end of rotor 35. The rotor 35 can rotate freely through ball bearings 37. As before, the cabling disk 27 separates the cable elements 20 that were twisted into a cable in the storage path. The cable is radially expanded and supplied to the perforated, or cabling, disk 23. In this embodiment, the disk 23 is integrated into the rotor 35 and immediately joined to the guide cone 28, which is also integrated into the rotor 35.

The cabling disk 27 has been described thus far as being allowed to run freely during the twisting process; however, the rotation of the cabling disk 27 can be braked by an adjustable braking force 39. For example, the cabling disk 27 may be provided with a drive 38 which is under the influence of the adjustable braking force 39.

Figure 5:
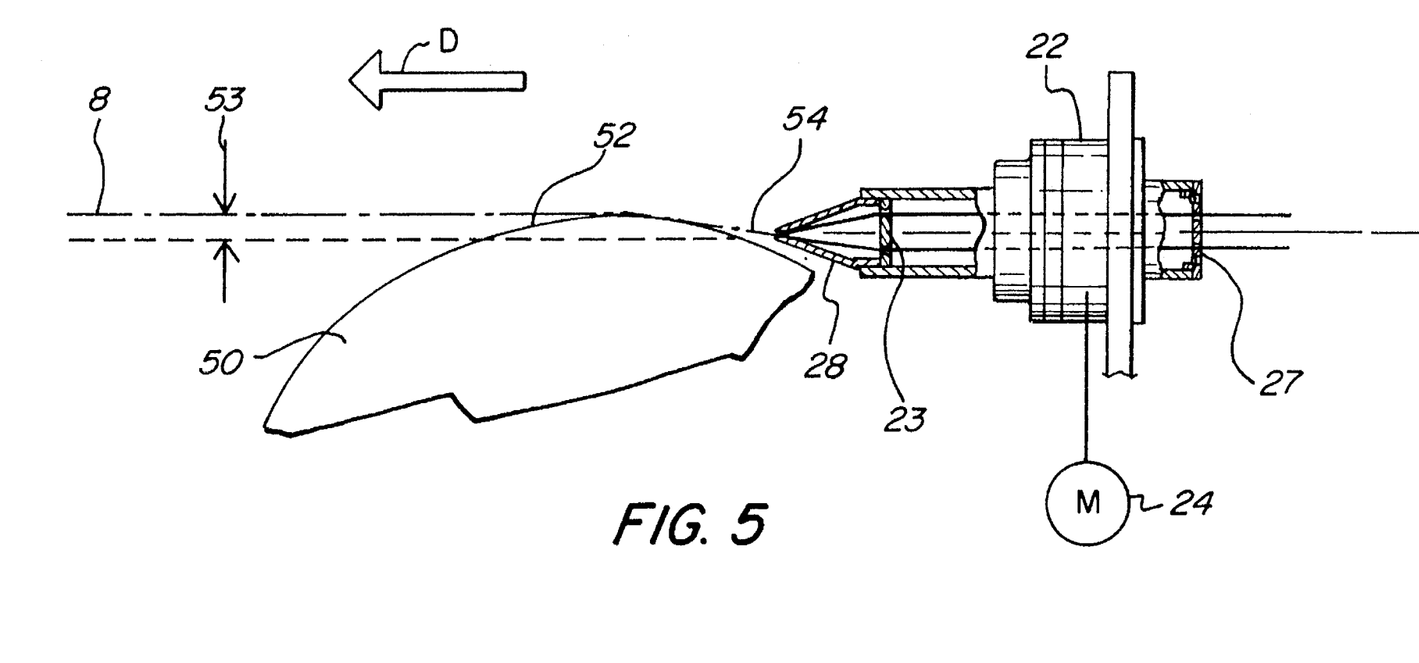
FIG. 5 which is an enlarged schematic diagram, partially broken away, of the apparatus embodying the principles of the present invention, as shown in FIG. 2, and including a takeup disk.

Referring again to FIG. 1, the invention has been described thus far as including a band pick-up 6 driven by a motor 7 for receiving the cable 8 and providing the cable to an extruder 9. The jacketed cable is then provided from the extruder 9 to a winding device 10. However, it may be desirable to provide a disk take-up 50 (FIG. 5) to receive the cable 8 at the output of the guide cone 28. Referring to FIG. 5, a circumferential surface 52 of the disk take-up 50 which receives the cable 8 is tangentially displaced 53 with respect to a discharge direction D of the cable 8 leaving the guide cone 28. Because of the displacement 53 of the circumferential surface 52 of the disk take-up 50, the cable 8 has a bend 54 in its flow. It has been found that this bend 54 in the discharge flow of the cable 8 shortens the twist change areas in the twisting of the cable 8.

Although the present invention has been described and discussed herein with respect to one or more specific embodiments, it will be understood that other arrangements and configurations can also be implemented without departing from the spirit and scope hereof. Hence, the present invention is deemed limited only be the appended claims and the reasonable interpretation thereof.

What is claimed is:

1. A process for reverse-twisting cable elements, said process comprising the steps of:

defining a storage path as a space between a fixed disk and a rotating perforated disk, said rotating perforated disk including a centrally located conical mandrel, said conical mandrel pointing toward said storage path and having a guide nipple disposed at a tapered end of said conical mandrel;

moving said cable elements laterally in a discharge direction along said storage path from said fixed disk to said rotating perforated disk;

alternatively twisting said cable elements in a first direction and then a second direction, which is inverse to said first direction, while moving said cable elements laterally in said discharge direction, said alternatively twisting resulting in twisting of said cable elements into a twisted cable along said storage path;

guiding said cable elements of said twisted cable through said guide nipple onto a surface of said conical mandrel; and radially expanding said twisted cable in said storage path during passage of said cable elements along said surface of said conical mandrel.

2. An apparatus for reverse-twisting cable elements; said apparatus comprising:

a fixed disk;

a rotating perforated disk, said rotating perforated disk being spaced apart from said fixed disk such that a storage path is defined therebetween, said rotating perforated disk including a centrally located conical mandrel, said conical mandrel pointing toward said storage path; and a guide nipple, said guide nipple being disposed at the tapered end of said conical mandrel and working in connection with said conical mandrel.

3. The apparatus as claimed in claim 2, wherein said conical mandrel is coated with a material having a low coefficient of friction.

4. The apparatus as claimed in claim 2 wherein said conical mandrel is fabricated from a material having a low coefficient of friction.

5. The apparatus as claimed in claim 2, wherein said conical mandrel is mounted for rotation.

6. The apparatus as claimed in claim 5, wherein said conical mandrel is mounted for rotation freely inside said perforated disk.

7. The apparatus as claimed in claim 2, wherein said guide nipple is mounted for rotation and for lateral movement in and opposite to said discharge direction.

8. The apparatus as claimed in claim 2, wherein said guide nipple is mounted for rotation, and wherein said guide nipple is driven to rotate in said twisting direction by the cable elements.

9. The apparatus as claimed in claim 2, wherein the cable elements move laterally in a discharge direction and wherein said guide nipple is mounted for movement in and opposite to said discharge direction.

10. The apparatus as claimed in claim 2, wherein at least one cabling disk is disposed along said storage path.

11. The apparatus as claimed in claim 10, wherein said at least one cabling disk is mounted for rotation.

12. The apparatus as claimed in claim 11, wherein each of said at least one cabling disk is individually driven by bearing friction.

13. The apparatus as claimed in claim 10, wherein one of said cabling disks is disposed immediately before said rotating perforated disk.

14. The apparatus as claimed in claim 13, wherein said cabling disk is combined with said conical mandrel.

15. The apparatus as claimed in claim 10, including means for adjusting the distance between said cabling disks with respect to each other and with respect to said rotating perforated disk.

16. The apparatus as claimed in claim 10, including means for braking said cabling disks by an adjustable braking force.

17. The apparatus as claimed in claim 10, wherein said cabling disks include guide bores each having an inlet and an outlet radii, and wherein the inlet and outlet radii of said guide bores are adapted to the circumference of said cable elements.

18. The apparatus as claimed in claim 2, wherein at least one guide is provided along said storage path to limit the trajectory of said twisted cable.

19. The apparatus as claimed in claim 18, wherein said at least one guide includes sections of tubing which are spaced apart at preselected intervals.

20. The apparatus as claimed in claim 2, further including a guide cone pointing in the axial direction on the side of said rotating perforated disk facing away from said conical mandrel.

21. The apparatus as claimed in claim 20, wherein the cable elements move laterally in a discharge direction and wherein the apparatus further includes a band pick-up having pick-up bands located in said discharge direction behind said rotating perforated disk, wherein a pointed end of said guide cone protrudes into the area between pick-up bands.

22. The apparatus as claimed in claim 21, wherein an end of said guide cone opposite said pointed end is equipped with another perforated disk.

23. The apparatus as claimed in claim 2, wherein the cable elements move laterally in a discharge direction and wherein the apparatus further includes a disk takeup located behind said rotating perforated disk in said discharge direction, said disk takeup having a circumferential surface which is positioned tangentially with respect to the direction that the cable elements are being supplied in said discharge direction, wherein the cable elements are fed onto said circumferential surface after being twisted into a cable, and wherein said cable is bent out of said discharge direction when being fed onto said circumferential surface.

* * * * *